United States Patent [19]

Shreve

[11] 4,373,810
[45] Feb. 15, 1983

[54] AUTOMATED EXPOSURE-CONTRAST CONTROL INDEX METER

[76] Inventor: James S. Shreve, 10027 Black Ct., Fairfax, Va. 22032

[21] Appl. No.: 156,909

[22] Filed: Jun. 6, 1980

[51] Int. Cl.[3] .......................... G01J 1/44; G03B 7/24
[52] U.S. Cl. ............................ 356/226; 354/23 R; 354/41; 354/50; 354/58; 356/221
[58] Field of Search ............... 356/218, 221, 222, 223, 356/224–228; 354/23 R, 28, 29, 58, 41, 43, 37, 38, 40, 48, 50, 65, 67

[56] References Cited

U.S. PATENT DOCUMENTS

4,304,473  12/1981  Shreve ........................... 356/221
4,309,089  1/1982  Harvey ........................... 354/37

*Primary Examiner*—Bruce Y. Arnold
*Attorney, Agent, or Firm*—Nathan Edelberg; Robert P. Gibson; Saul Elbaum

[57] ABSTRACT

An apparatus and method for determining a film development parameter and a camera exposure setting to compensate for the luminous dynamic range of a subject being photographed which takes film non-linearities into account. Film characteristic curve data is stored in a read only memory of the apparatus. In a semi-automatic embodiment, information corresponding to desired film densities for two areas of the subject matter is manually inputted to the apparatus, which is then pointed towards the two areas. In an automatic embodiment, information corresponding to desired film densities for the brightest and least bright areas of the subject to be photographed is manually inputted, the entire subject is automatically scanned by a vidicon or equivalent means, and the brightest and least bright areas of the subject are automatically detected. During operation, film characteristic curve data corresponding to the desired film densities is retrieved from the read only memory and is utilized in the calculations of development parameter and exposure setting.

15 Claims, 9 Drawing Figures

AUTOMATED EXPOSURE-CONTRAST CONTROL INDEX METER

The invention described herein may be manufactured, used, and licensed by or for the United States Government for governmental purposes without the payment to me of any royalty thereon.

The present invention pertains to the measurement of luminous intensity and intensity dynamic range for photographic purposes. It is an improvement over the invention disclosed in U.S. Patent Application Ser. No. 052,300, filed June 26, 1979, now U.S. Pat. No. 4,304,473 assigned to the same assignee as the present invention and incorporated herein by reference. In the invention of Patent Application Ser. No. 052,300, an apparatus for determining a film development parameter and a camera exposure setting to compensate for the luminous range of a subject being photographed is described. In that apparatus the film characteristics were modelled by a linear relationship between density and the logarithm of exposure, while in the improvement of the present invention the actual film characteristics are employed. This permits exploitation of the non-linear portions of the film characteristic curve, in particular the regions where density is either very low or very high, and also permits accommodation of certain films which are non-linear over most of their usable range, such as Kodak High Definition Aerial Film 3404 when developed in D-76 developer. In general, higher quality photographic recording can be made by employing the invention disclosed than is usually the case. Such quality is particularly beneficial in applications of automatic aerial photography, handheld aerial photography, surface reconnaissance photography, photographic recording of evidence and scientific data, and artistic photography.

In photographic recording of all types the usual approach neglects to systematically compensate for the luminous range of the subject material, or to make use of the non-linearities of the film. It is possible, however, to match, or deliberately mismatch in a controlled manner, the film dynamic range to subject luminous range by adjusting the film development parameters, or by choosing a different film type. Also, by comparing luminous intensity readings of various subject areas with film characteristic data, the effects of film non-linearities can be seen, and the film type producing the desired results thereby selected. The disclosed invention provides the means to readily choose the film development parameters and film type to produce the desired effect, as well as to select the proper camera settings. It provides an automatic means for accomplishing what a few photographers have been doing manually when practising what is known as the "zone system."

The zone system, although it is based upon scientific principles, was formalized by Ansel Adams primarily to produce esthetically-pleasing photographs. The zone system has not been popular because it has entailed time-consuming measurements and mental calculations at the time the exposure is to be made. Mechanical calculators have been developed to ease the task, but they still require manual data entry by the operator. At best the zone system has been awkward and slow in implementation, and therefore not suitable for many applications.

It is therefore an object of the invention to provide an improved apparatus and method for compensating for luminous dynamic range in making photographic records. It is a further object of the invention to provide such an apparatus and method which takes film non-linearities into account.

The above objects are accomplished by providing an apparatus which utilizes a photosensitive light measuring device which is coupled to a microprocessor which incorporates a film-data memory. The film characteristic data, taken at intervals along the characteristic curve, for each of a number of film types and for each of a number of development variations for each type, are stored in a read only memory (ROM) in the device which serves as the film data memory. Luminous intensity readings are taken by the photosensitive device and operated upon by the microprocessor to produce the desired output, namely the required exposure "E", and the "contrast control index c" which specifies the deviation from normal film development. A second function performed by the microprocessor is the determination of film densities that would be produced, given the film type, exposure value, and development parameters, by additional luminous intensity values as read by the photosensitive device.

There are two modes of operation which may be affected by two respective embodiments of the invention, or by a single multi-purpose implementation if desired. In the "semi-automatic" embodiment, the operator treats the device like a spot exposure meter in that he aims it at specific areas of interest within the camera field of view. In the "automatic" embodiment the entire field of view is automatically scanned by the device. The latter would be required for unmanned applications such as automatic aerial photography.

In the semi-automatic embodiment the operator selects two subject areas and assigns to them numbers which represent the desired effect that their luminance will have upon the film. In technical terms he is specifying particular film densities; in terms of the zone system he is specifying density zone numbers; in popular terms he is specifying "deep shadow," "highlights," etc. The numbers are assigned by means of a data entry switch which, in the preferred embodiment, is set just prior to taking each luminous intensity reading.

In the automatic embodiment the apparatus automatically selects the extremes of the luminance readings, or a modification of the extremes obtained by scanning the subject, and automatically assigns to them pre-selected numbers corresponding to the operator-assigned numbers above.

While the manual embodiment includes visual readouts, and has provision for examining the response to additional subject areas as read by the device, the automatic mode provides control signals to the camera or camera complex directly. Of course, a visual readout may be provided in any case if desired, and direct control of the camera can be provided even though readings are taken as in the manual mode. In the latter case, the device might be built into the camera, and could share the camera viewfinder so that the whole camera is aimed to take the readings.

Once the proper readings of luminous intensity have been taken with the device, it has the capability of determining the response of any film type which is characterized in the ROM. By response is meant: (1) can the film accommodate the scene by producing the densities specified; (2) if so, what exposure and development are required; and (3) what densities will be produced for additional readings of luminous intensity as taken by the device.

The invention will be better understood by referring to the following drawings in which.

To simplify the explanation of the invention, the remainder of the specification is broken down into sections as follows:

1. MATHEMATICAL DESCRIPTION
1.1: The Zone System
1.2: The Parameter Z
1.3: Characteristic Curves
1.4: Relationships For Determining Camera Settings
1.5: Method of Determining Development Parameters
2. THE SEMI-AUTOMATIC EMBODIMENT
2.1: Overall Configuration
2.2: Microprocessor Program
2.3: Operation
3. THE AUTOMATIC EMBODIMENT
3.1: Overall Configuration
3.2: Microprocessor Program
3.3: Operation

1. MATHEMATICAL DESCRIPTION 1.1: The Zone System

An attempt is made here to formulize and refine the manipulations associated with the zone system, so that the benefits of the zone system may be obtained by the use of the microprocessor of the present invention.

The first task is to define terms in a concise manner. The word "zone" itself has been used to mean different things in different contexts, and therefore its use will be dropped from the mathematical expressions that will ultimately govern the microprocessor. The word "zone" will be useful, however, in describing new terms, especially to those familiar with the zone system.

At least sometimes, "zone" has referred to luminance. The luminance zone value (written I, II, III, IV, etc.) is relative. Usually a zone III subject area has meant an area that is the darkest in which the operator wishes to preserve detail, detail meaning small local fluctuations in luminance about the area average. Each succeeding zone (next higher integer) represents twice the luminance of the preceding one. Under what has come to be called "average" conditions, a standard 18%-reflectance gray card falls into zone V, and the brightest area in which detail is to be preserved falls into zone VIII.

Thus, under average conditions, the range of luminance recorded is about five zone numbers, or a luminance ratio of 32:1.

Most photographic films, when given standard or normal development, accommodate this luminance range if the camera settings are adjusted properly. When non-average subjects are to be recorded, the range of luminance to be accommodated may be more or less, thereby causing a degradation in the photographic record unless some compensation is introduced. If the luminance range greatly exceeds 32:1, the denser portions of the negative suffer from graininess, unsharpness, and printing difficulties; if the luminous range is much less than 32:1, the problem is similar to a poor "signal-to-noise" ratio in communications system—i.e., random or other unwanted variations contribute excessively to the final photographic record.

A more subtle effect arises because of the non-linear response of film, particularly near the extremes of the luminous range that can be accommodated. One effect is the preservation of detail in both brighter and darker areas than would otherwise be expected. This is analagous to "soft limiting" in electronic circuits. An improper non-linear response can cause unwanted distortions, the inclusion of detail where it is not desired, or the exclusion of detail where it is desired.

Fortunately, non-normal film development can change the luminous range accommodated by the film, and the shape as well as the position of non-linear regions. Thus the film response can to some extent be adjusted so as to produce the desired results for a given subject.

In the classic zone system, the number of luminance zones to be accommodated is determined with the aid of a "spot exposure" meter. This is a very narrow field-of-view luminance meter, which permits small subject areas to be measured independently. The difference between the measured range of zone numbers and the standard five zones is an indication of the extent to which normal film development must be modified.

Typically, the camera exposure settings are then based on the luminance measured at the dark end of the scale, i.e., a zone III luminance, with perhaps some estimated correction added. With no correction, this means of determining exposure settings is quite rough, since it erroneously assumes that the light energy required to produce a record at this end of the film's dynamic range is independent of film development. This is not a good approximation, as can be seen by examining typical film characteristic curves. The method adopted in the present invention makes use of an actual data point on the characteristic curve appropriate for the chosen film and development to determine exposure.

1.2 The Parameter Z

We now introduce a parameter "z" which is defined in terms of film density. The following observation is perhaps more illuminating than the definition, however. That is, under normal exposure and development, each subject area within the normal luminance range produces a value of z which equals the luminance zone number. In effect it is a "density" zone number, although it is not limited to integral values as zone numbers classically have been.

We actually define z by $$z = 1.1 + 6D \qquad (1.)$$

where D is the film density. A z of 5.0 implies a density of 0.65, which is considered appropriate for a normal "zone V" luminance. A z of 3.0 implies a density of 0.32, and a z of 8.0 implies a density of 1.15.

We can now describe the zone system as one whereby given luminances are assigned, or caused to produce, desired values of z. Under normal conditions a zone III luminance is assigned a z of 3, a zone VIII luminance is assigned a z of 8, and so on. For a subject having a greater range to be recorded, a zone IX or zone X luminance might be assigned a z of 8. Thus z describes an effect, while luminance zone describes a cause.

1.3 Characteristic Curves

Figure 1:
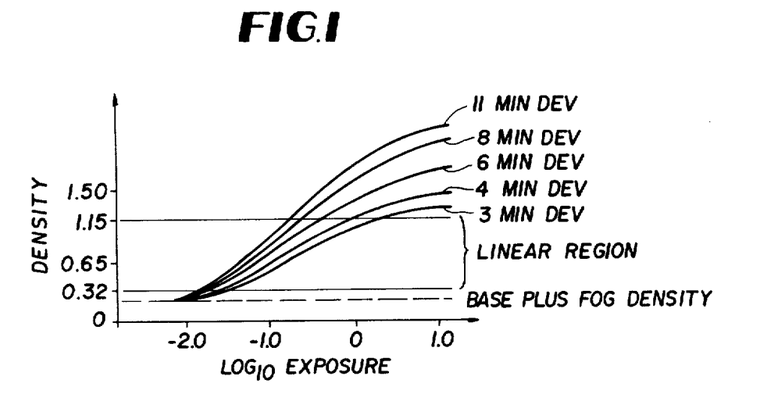
FIG. 1 is a graph which depicts characteristic curves for a specific film type.

Light-sensitive films and papers are usually described by "characteristic curves" which plot resulting density as a function of the logarithm (base 10) of exposure, exposure being the incident energy per unit area. A family of curves is associated with each film type, one curve for each of several developing variations. Published data usually show one curve for each of several development times, although other parameters such as temperature, developer concentration, etc. can be varied instead. FIG. 1 shows a typical family of characteristic curves for one film type. For light-sensitive papers the development is usually kept fixed, while the exact composition of the sensitized layer is varied. Thus each paper type is manifest as several distinct manufactured products, each classified by a "contrast number."

Figure 2:
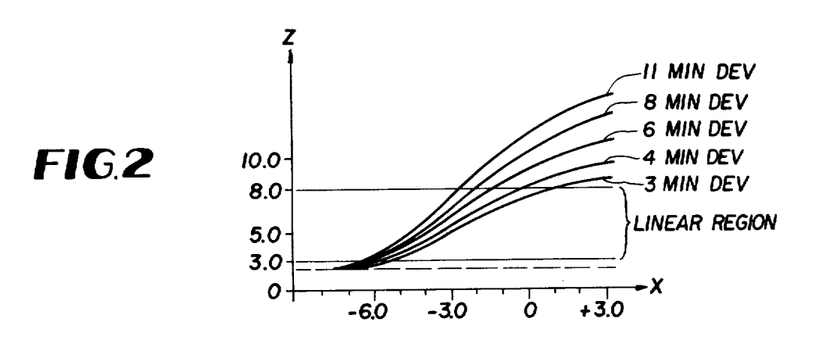
FIG. 2 is a graph which depicts the same curves as FIG. 1 but in which densities are given in values of Z and the base 10 logarithmic exposure values are replaced by base 2 values denoted as X.

In FIG. 2, densities are given as values of z, and the base-10 logarithmic exposure values are replaced by base-2 logarithmic values, denoted here by x. That is, $$x = \log_2 q, \tag{2}$$

where q is the total light energy per unit area incident upon the sensitized surface. For ease of manipulation in a microprocessor, the use of the variables z and x instead of D and log base-10 of exposure, is preferred although not required in the present invention.

1.4 Relationships for Determining Camera Settings

Subject luminance, as determined by a photoelectric device of one kind or another, is related to the energy density incident on the film by the following:

$$q = (\pi/4)(L/F)^2 Tt \tag{3}$$

where q is given in terms of lumen seconds per meter squared,

L is luminance in lumens per steradian per meter squared,

F is the lens aperture setting or "f number",

T is the lens transmittance, and t is the shutter open time in seconds.

If, as is usually the case, luminance is obtained as a meter reading "R", in candles per square foot, we have $$L = 10.8R, \tag{4}$$

and $$q = 8.5RtT/F^2 \tag{5}$$

Assuming the usually-assumed but optimistic value of 0.94 for transmittance T, we obtain $$-\log_2 t = 3 + \log_2 R - 2 \log_2 F - x \tag{6}$$

Of course $$(1/t) = 2 - \log_2 t \tag{7}$$

Alternately, solving for log aperture setting, we have $$\log_2 F = 1.5 + 0.5 \log_2 R + 0.5 \log_2 t - 0.5x \tag{8}$$

Thus, if the appropriate x (relating to energy requirement of the film) is known and if a luminous intensity reading R is known then, given either shutter setting 1/t or aperture setting F, the other can be determined. Note that equation (6) might be rounded off to an integral value since shutter settings are often usable only at points which are integral powers of ½.

1.5 Method of Determining Development Parameters

In general, luminous intensity readings are taken for two different subject areas. For each a value of z is assigned. Now for aperture and shutter settings fixed, $x - \log_2 R$ is established. That means that the film characteristics must indicate an $x_i$ for each specified $z_i$ such that the corresponding $R_i$ measurement keeps $x_i - \log_2 R_i$ constant. The computational procedure is to assume a given development, from the corresponding characteristic data find x for each of two readings, compute $x - \log_2 R$ for each of the readings, and compare values. If they are not approximately equal a new development is assumed and the process is repeated. The development parameters which provide the closest match are then chosen as being "correct". If there is no close match, a warning indicator may be activated. In a more refined version, interpolation of parameters may be done on the basis of the two closest matches.

In the preferred embodiment of the present invention the film type is operator selected, while the microprocessor is arranged to automatically search the film characteristic data for that film type for the various development variations until the required match is found. If the operator then selects a new film type, the microprocessor will seek a new match for that film type.

Development variations are specified here by a "development control index" denoted by "c". Since development variations primarily affect the slope of the characteristic curve, c is a measure of the deviation from normal of the contrast resulting from a given development variation, regardless of the exact nature of the variation. Thus characteristic data is stored in ROM for each of several values of c, and c is actually what is read out to the operator.

A value of c of +1 indicates that a range of z of six is produced instead of a normal range of five, given a range of x of five, which is approximately equivalent to a change of 0.1 in the commonly-used "contrast index" (actually it is approximately 0.11). This is also roughly equivalent to what is meant by the phrase "pushing development one stop." Each unit greater or lesser in the value of c represents one unit greater or lesser in the range of z produced for a range of x of five, or approximately one-tenth unit greater or lesser in contrast index. The value of c read out can be equated to numbers of stops "pushed," or to tenths of change in contrast index. Published data then provides appropriate development instructions.

2. THE SEMI-AUTOMATIC EMBODIMENT

2.1. Overall Configuration

Figure 3:
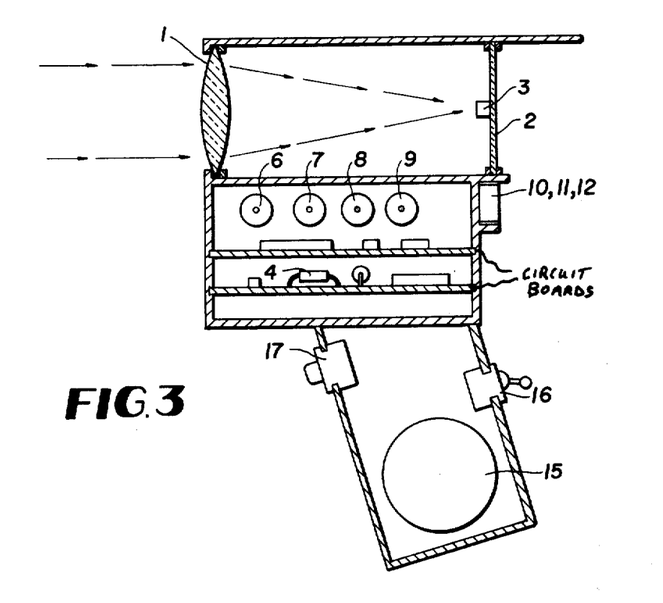
FIG. 3 is a pictorial illustration in cross-section of a possible physical configuration for the semi-automatic embodiment of the invention.

The apparatus of the semi-automatic embodiment of the invention is shown in FIG. 3, and will be seen to be comprised of a luminance measuring device, an A/D converter, switches for entering data, a microprocessor, a ROM for storing film characteristic data, a display, and a power source. As illustrated in FIG. 3, a typical luminance measuring device for this application consists of a lens 1 which focuses the image of the subject upon a translucent sighting screen 2, a photodetector 3 located near the center of the image facing the lens, and a suitable electronic amplifier 4 driven by the photodetector. Thus the luminance of the image falling on the photodetector, which is a small portion or "spot" near the center of the viewed image, is converted to a corresponding electrical signal.

Figure 4:
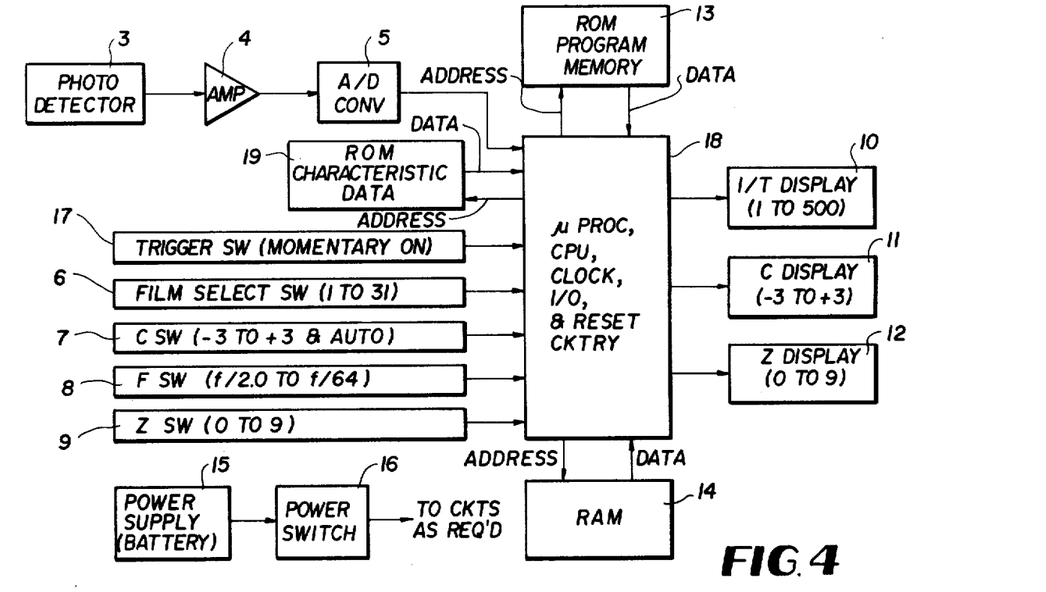
FIG. 4 is an electronic block diagram of the circuitry of the semi-automatic embodiment of the invention.

The A/D converter 5, shown in FIG. 4 is connected to the output of the amplifier in the luminance measuring device, and provides a digital output which is proportional to the measured luminance. Since the luminance must be put in logarithmic form, the A/D converter might be designed to do this directly. Instead, the microprocessor itself might perform the A/D conversion with the aid of a few analog parts such as a D/A converter and a comparator, and could obtain the logarithmic form directly. It is recognized that there are other means for performing this conversion, including non-linear analog circuits and digital look-up tables.

The data switches 6, 7,8 and 9, and the LED readouts 10, 11 and 12, and their ranges shown in FIG. 4 are only typical. In the preferred embodiment, the displays for c and z include low and high over-range display portions. As a means for increasing versatility as is explained below, a switch for the development control index c is included.

In the primary mode of operation the switch for c is set to AUTO, as c is one output to be provided by the device. The value for z is then entered for each of two luminance readings before those readings are taken. If the switch for c is set to a specific value instead of AUTO, then only one value of z is entered and only one reading is taken, as only exposure is to be computed and read out. Once the exposure has been calculated, the value for z will be displayed for each new luminance reading taken by the operator. This serves as a check on the appropriateness of the chosen parameters.

The microcomputer is comprised of microprocessor 18 which includes the CPU, clock, input-output and reset circuitry; read only memory 13 which stores the program; read only memory 19 which stores the film characteristic data; and random access memory 14 which is used for temporary storage of data.

In the preferred embodiment, characteristic data is stored in ROM 19 by employing several address bits to represent the value of z, while the memory contents at that address specify the corresponding x. Four address bits would adequately specify z. Less significant address bits (e.g. 3 bits) specify c, and more significant address bits (e.g. 5 bits) specify film type. Of course, other bit assignments are equally feasible and are within the scope of the present invention.

2.2 Microprocessor Program

Figure 5A:
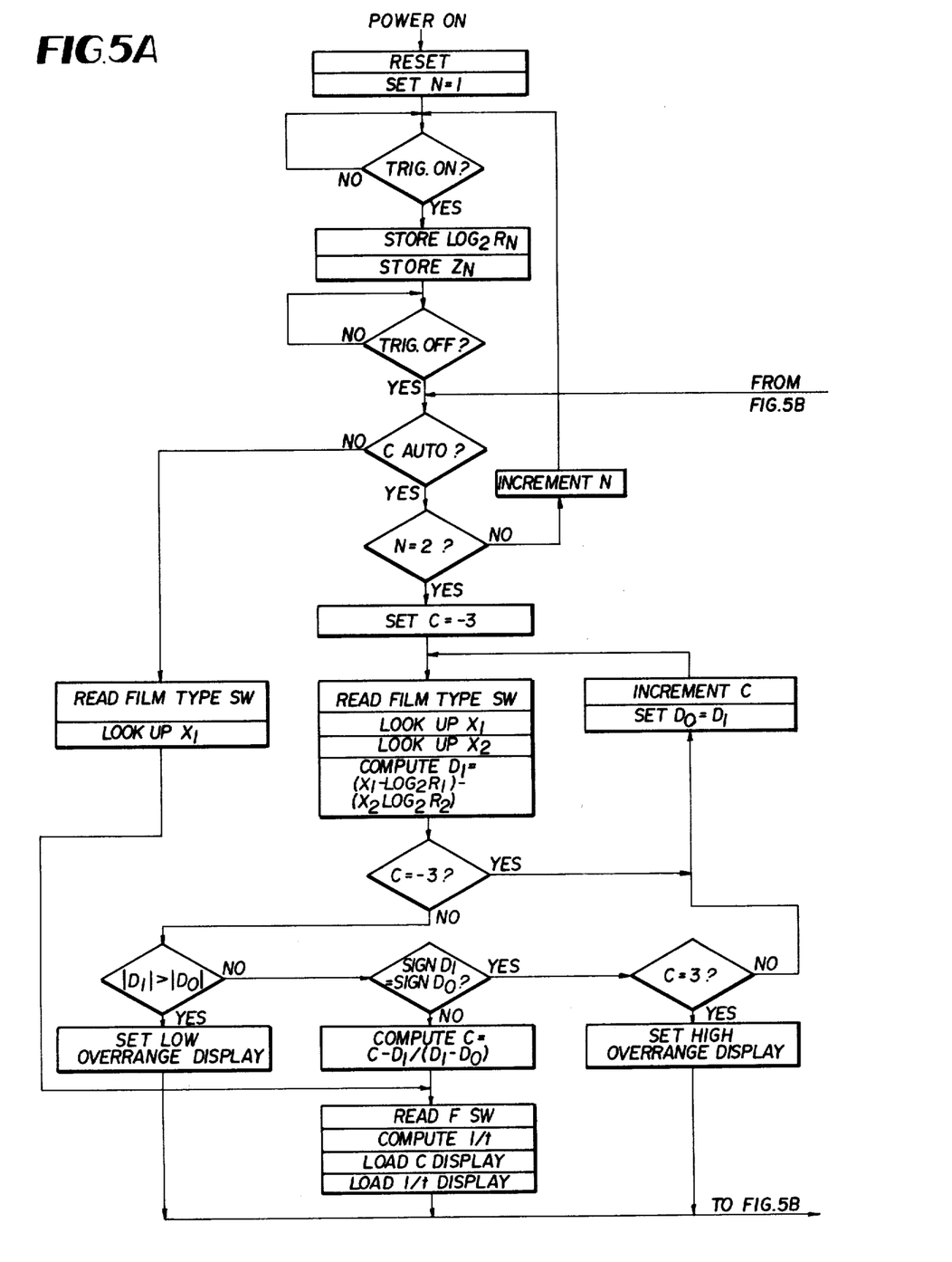
FIGS. 5A and 5B are a flow chart for the microprocessor program utilized by the semi-automatic embodiment of the invention.
Figure 5B:
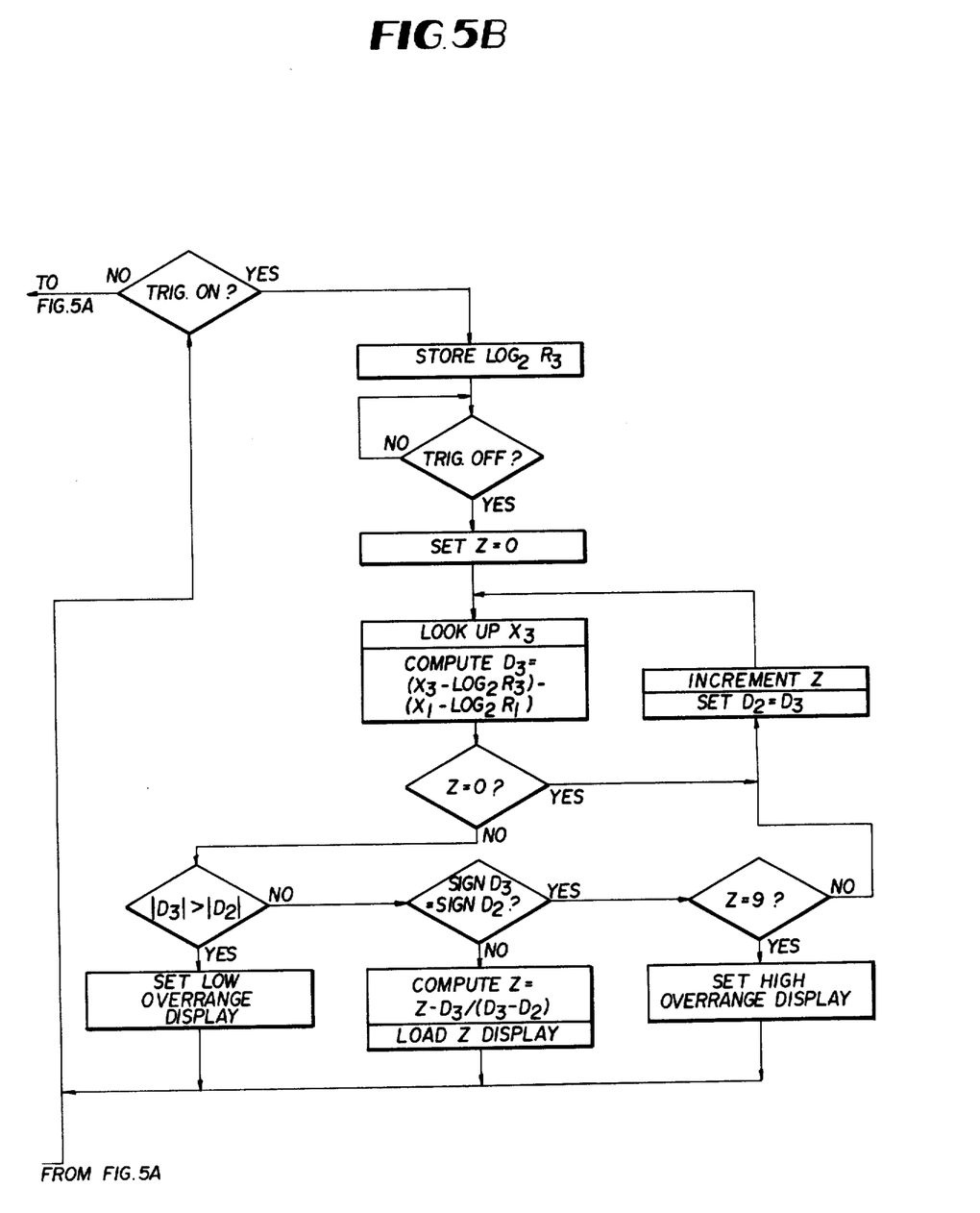

A typical program, which will perform the operations described above, is presented in flow-chart form in FIG. 5. Specific programming for the computations defined in the individual blocks is a routine programming task, within the skill of one in the art.

2.3 Operation

With the preceding program, the operator has a choice of either taking two luminance readings and specifying a value of z for each, which is the primary mode of operation, or taking one reading and specifying a value of c. For the primary mode the c switch is set to AUTO; otherwise a desired development control index is entered. It should be noted that zero represents normal development, unity represents a pushed development sometimes referred to as "n+1 development," and so on. If zero is entered and the z switch is set to the commonly-used gray-card approximation of five, then the device behaves identically to a conventional spot exposure meter.

In any case the operator selects the one or two critical subject areas to measure, and decides on their desired effects in terms of z values. Recall that a z of three usually applies to the darkest area in which detail is to be preserved, while a z of eight usually applies to the lightest area in which detail is to be preserved.

In the preferred embodiment the mechanics of taking readings proceeds as follows. The power switch 16 is turned on, and the switches for film type, c, and lens aperture setting are set to the desired values. The value for z for the first subject area is then entered, the device is aimed so that the image of that area falls upon the photodetector, and the trigger switch is momentarily turned on. If two areas are to be measured, the second value for z is entered, the device is re-aimed toward the second subject area, and the trigger switch is again momentarily turned on.

The display will now exhibit the computed values of 1/t and c, if appropriate. The film type and/or lens aperture setting switches may now be changed if desired, and the displays will change accordingly.

At this point, if desired, the operator may take readings on additional subject areas by aiming and momentarily turning the trigger switch on. Each time the computed value of z for that subject area, for the selected film type and the previously-determined value of c, will be displayed. If the operator is dissatisified with these results, he has the option of starting over by momentarily interrupting the power with the power switch, or of introducing a new value of c, which again is accomplished by interrupting the power, then setting the c switch to the desired value and taking a reading on one critical subject area with an appropriate z entry. Of course, any new exposure solution can be tested on additional subject areas as before.

3. THE AUTOMATIC EMBODIMENT 3.1 Overall Configuration

The fully-automatic meter comprises a luminance measuring device, A/D converters, switches for entering data, a microprocessor, a ROM for storing film characteristic data, output control lines, and a power source. A typical luminance measuring device for fully automatic operation incorporates a photodiode-array camera or a vidicon camera, with the same field of view as the camera which is to be controlled. Preferably the luminance-measuring camera is affixed to the controlled camera, and is bore-sighted to it.

Figure 6:
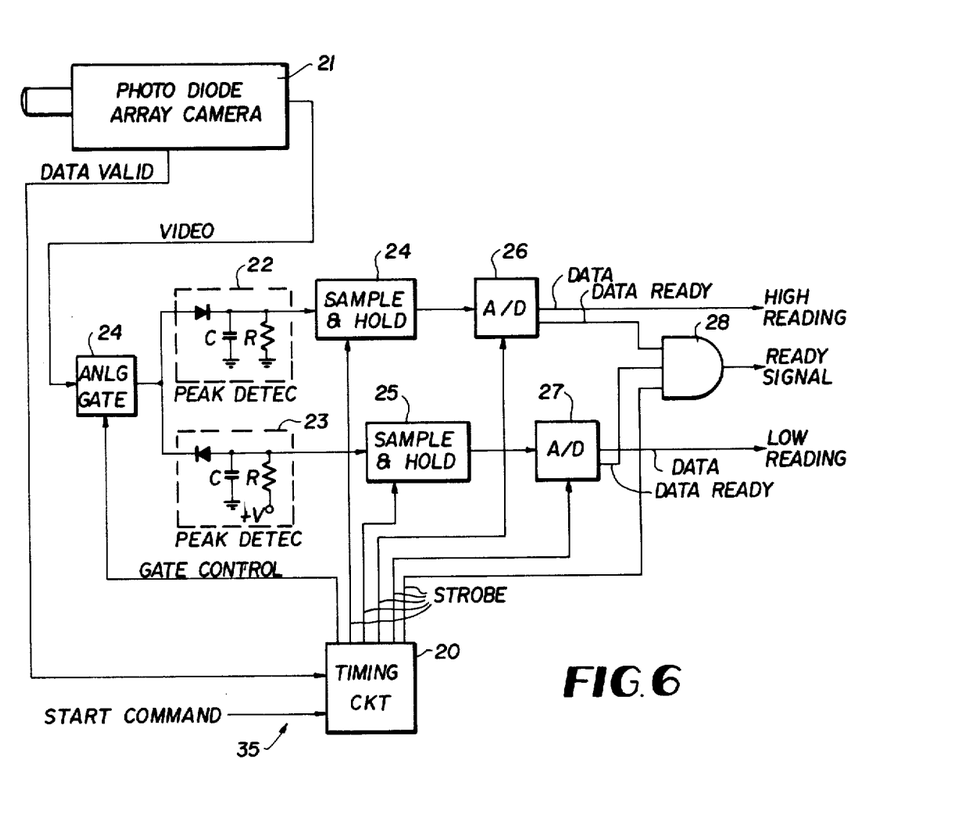
FIG. 6 is a block diagram of exemplary luminance-measuring circuitry utilized by the fully automatic embodiment of the invention.

The lowest and highest luminance values are determined by circuits which detect the lowest and highest signals coming from the luminance-measuring camera. FIG. 6 shows typical circuitry for accomplishing this. The timing circuit 20 passes the video signal from the camera 21 to two peak-detecting circuits 22 and 23 by means of an analog gate 24. The peak-detecting circuits have oppositely-directed diodes and opposite restoring polarities, so that one circuit responds to the lowest video amplitude while the other circuit responds to the highest video amplitude. The circuit is arranged to be in its floating state when video is not present, so as not to produce a false lowest reading.

After at least one full frame of video has been processed, the sample-and-hold circuits 24 and 25 are activated to acquire the lowest and highest readings from the peak detectors. This is quickly followed by an A/D conversion command. When both A/D converters 26 and 27 signal that they have digitized the readings, the AND gate 28 sends a "ready" signal to the microprocessor, which then accepts the readings.

Figure 7:
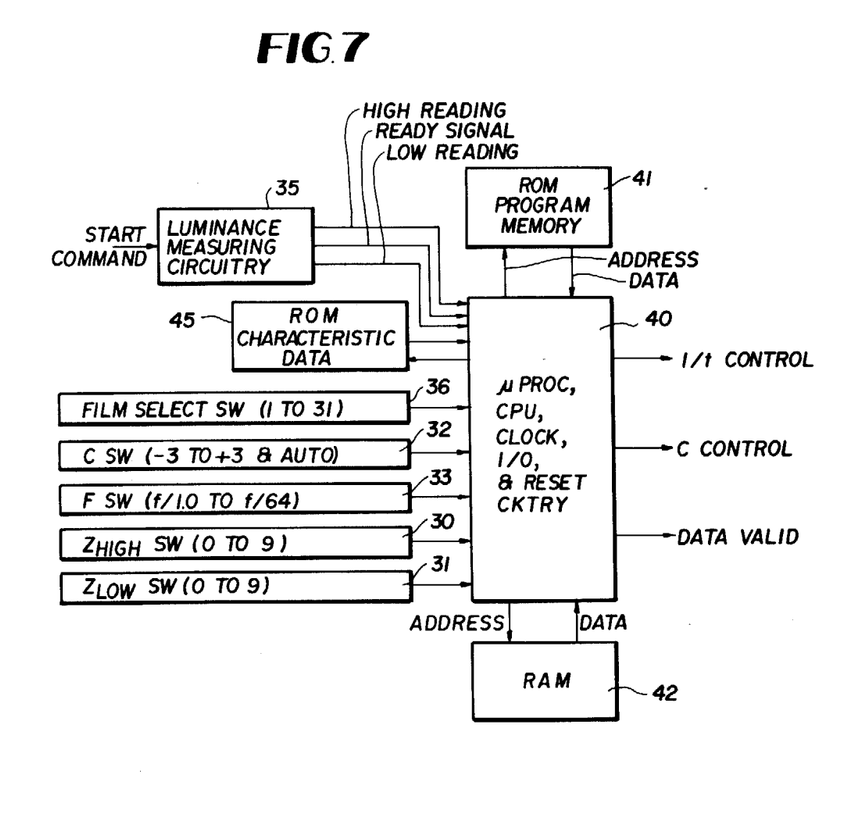
FIG. 7 is a block diagram of the general circuitry of the fully automatic embodiment of the invention.

FIG. 7 is a block diagram of the overall configuration. It is recognized that many variations are possible and that the configuration illustrated here is patterned after the semiautomatic embodiment. The microcomputer is comprised of units 40, 41, 42 and 45 and is as described in conjunction with FIG. 4. The output lines typically go directly to the camera being controlled, while the "start" command comes from whatever controls the times at which photo records are desired. The "data valid" output is a microprocessor-controlled level which remains true for a short time after each set of computations have been made, and serves to disable the controlled camera when the last computations are no longer current; upon completion of the next computations the controlled camera is again enabled.

3.2 Microprocessor Program

Figure 8:
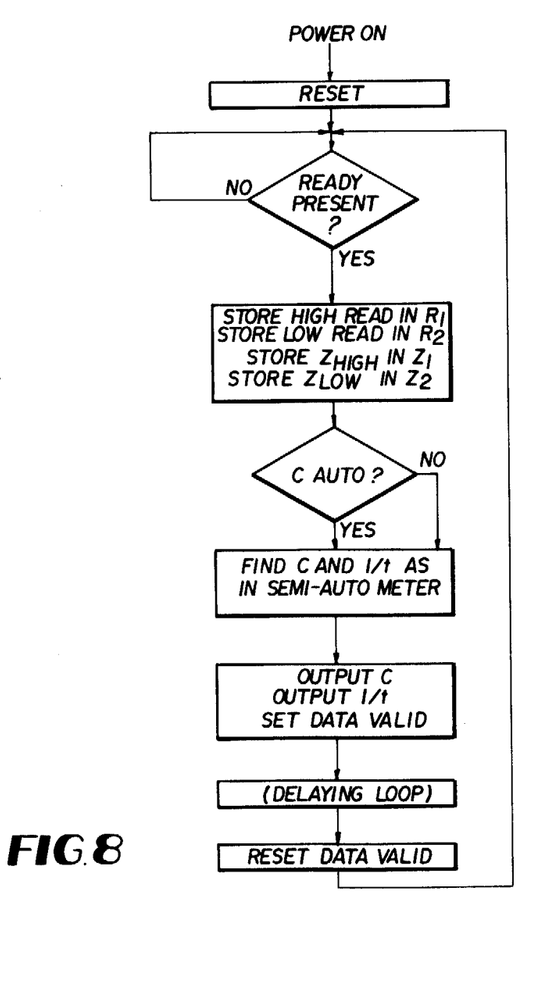
FIG. 8 is a flow chart for the microprocessor program utilized by the fully automatic embodiment of the invention.

A typical program is presented in flow chart form in FIG. 8.

3.3 Operation

The fully-automatic meter is affixed to the camera-carrying vehicle or to the controlled camera itself, and is bore-sighted to the controlled camera. The field-of-view of the meter is adjusted to coincide with that of the controlled camera.

Prior to operation, values for z for the darkest and lightest subject areas are entered into the meter. Typically these are three and eight respectively, although experience may indicate better choices under certain conditions. Film type is also entered, and in the system illustrated the lens aperture setting is entered, although this could be controlled by the meter instead of, or in addition to, shutter speed.

Electric signals representing the value of c will either: select one of several film magazines, each dedicated to a different specific value of c (and therefore developed differently); will select one of a bank of cameras, each again dedicated to a different specific value of c; or will cause a record associated with the film to be made which indicates the proper development for each frame or section of film. A variation of the latter is the selection of one development for all film exposed based on the best accommodation to the various recorded values of c, e.g. the average value, or the minimum value.

There thus has been described an improved exposure-contract control meter which takes film non-linearities into account.

I wish it to be understood that I do not desire to be limited to the exact details of construction shown and described, for obvious modifications can be made by a person skilled in the art.

I claim:

1. An apparatus for determining a film development parameter value and camera exposure setting for subject matter to be photographed which takes into account film non-linearities comprising, means for storing data which substantially defines a plurality of film characteristic curves corresponding respectively to a like plurality of film development parameter values, means for sensing the luminous intensity of certain areas of said subject matter and for providing luminous intensity electrical signals which correspond to said sensed luminous intensities, means for providing film density electrical signals indicative of respective film densities which it is desired for the respective luminous intensities of said certain areas to produce on said film, means for retrieving that portion of said stored data which is representative of characteristic curve values which correspond to said respective desired film densities, and means responsive to said luminous intensity electrical signals, and said film density electrical signals and to said retrieved date for deriving said film development parameter value and camera exposure setting.

2. The apparatus of claim 1 wherein said means for providing film density electrical signals includes a manual data entry means for allowing operator selection of settings which respectively correspond to said desired film densities.

3. The apparatus of claim 2 wherein said means for sensing the luminous intensities of certain areas and for providing luminous intensity electrical signals includes photoresponsive means.

4. The apparatus of claim 3 wherein said photoresponsive means is a means for sensing only a small area of the subject matter to be photographed, and is also capable of being manually moved to different orientations to sense different areas.

5. The apparatus of claim 4 wherein said different areas consist of two areas which are selected by an operator.

6. The apparatus of claim 3 wherein said photoresponsive means is a scanned means for sensing the entire extent of the subject matter to be photographed.

7. The apparatus of claim 6 wherein said different areas are the brightest and least bright areas of the subject matter, further including means for automatically detecting said brightest and least bright areas.

8. The apparatus of claim 7 further including means for providing an output signal which may be used to automatically control the exposure setting of a camera.

9. The apparatus of claim 3 further including means for displaying said determined film development parameter and exposure setting.

10. The apparatus of claim 3, wherein there is further provided means responsive to said retrieved data, said derived exposure setting and film development parameter value, and any subsequent luminous intensity signal, for providing indication of the film density which would be produced by the luminous intensity corresponding to said luminous intensity signal if the subject matter were photographed at said derived exposure setting and the film were developed in accordance with said derived film development parameter value.

11. The apparatus of claim 10, wherein the data retrieving means includes a manual selection means for allowing operator selection of the film development parameter value, wherein only the portion of the stored data defining the film characteristic curve corresponding to the selected film development parameter value is retrieved by the data retrieving means, and wherein the exposure setting is derived by said deriving means in response to the retrieved data, the first film density signal selected by the operator, and the corresponding luminous intensity signal.

12. The apparatus of claim 1 wherein said film development parameter is the contrast control index.

13. An apparatus for determining an exposure setting for subject matter to be photographed which takes into account film non-linearities, comprising:
- means for storing data which substantially defines a film characteristic curve;
- means for sensing the luminous intensity of selected small areas of said subject matter and for providing luminous intensity electrical signals corresponding respectively to said sensed luminous intensities;
- means for providing a film density electrical signal indicative of a film density selected by the operator which it is desired for the luminous intensity of a first selected area of the subject matter to be produced on said film;
- means for retrieving said stored data;
- means responsive to the film density electrical signal and the corresponding luminous intensity electrical signal for the first selected area and to the retrieved data for deriving said exposure setting; and
- means responsive to any subsequent luminous intensity electrical signal for another selected area of the subject matter, to the derived exposure setting, and to the retrieved data for providing indication to the operator of the film density which would be produced by the luminous intensity of the other selected area if the subject matter were photographed at said derived exposure setting.

14. The apparatus of claim 13, wherein:
- the data storing means includes stored data which substantially defines a plurality of film characteristic curves corresponding respectively to a like plurality of film development parameter values; and
- the data retrieving means includes a manual selection means for allowing operator selection of the film development parameter value, wherein only the portion of the stored data defining the film characteristic curve corresponding to the selected film development parameter value is retrieved by the data retrieving means.

15. The apparatus of claim 14, wherein said data stored in said data storing means substantially defines a plurality of film characteristic curves corresponding to a like plurality of film development parameter values for each film type of a plurality of film types, and said apparatus further comprises manual film type selecting means for limiting the stored data retrieved by said data retrieving means to data defining the film characteristic curves for a film type selected by the operator.

* * * * *